United States Patent
Nakajima et al.

(12)

(10) Patent No.: US 6,424,871 B1
(45) Date of Patent: Jul. 23, 2002

(54) ROTATING MACHINE INTEGRATED WITH CONTROLLER, AND INVERTER

(75) Inventors: Kaoru Nakajima, Tokyo; Yasuki Tadokoro, Fujisawa, both of (JP)

(73) Assignees: Ebara Corporation; Ebara Densan Ltd., both of Tokyo (JP)

( * ) Notice: Subject to any disclaimer, the term of this patent is extended or adjusted under 35 U.S.C. 154(b) by 0 days.

(21) Appl. No.: 09/297,262

(22) PCT Filed: Oct. 30, 1997

(86) PCT No.: PCT/JP97/03965

§ 371 (c)(1),
(2), (4) Date: Jul. 8, 1999

(87) PCT Pub. No.: WO98/19389

PCT Pub. Date: May 7, 1998

(30) Foreign Application Priority Data

| Oct. 31, 1996 | (JP) | ............................................. 8-305860 |
| Nov. 13, 1996 | (JP) | ............................................. 8-317179 |
| Nov. 19, 1996 | (JP) | ............................................. 8-323603 |

(51) Int. Cl.[7] .............................................. H02P 7/63
(52) U.S. Cl. ......................... 700/11; 700/275; 700/276
(58) Field of Search ............................ 700/21–22, 276, 700/282, 11

(56) References Cited

U.S. PATENT DOCUMENTS

| 4,507,936 | A |   | 4/1985  | Yoshino .................... 62/235.1 |
| 4,873,649 | A | * | 10/1989 | Grald et al. ................ 700/276 |
| 5,043,926 | A | * | 8/1991  | Naka et al. ................. 364/550 |
| 5,491,831 | A | * | 2/1996  | Williams et al. ........... 455/33.1 |
| 5,499,212 | A |   | 3/1996  | Amanai ....................... 365/218 |
| 5,605,053 | A | * | 2/1997  | Otori ........................... 62/180 |
| 5,613,369 | A | * | 3/1997  | Sato et al. ..................... 62/89 |
| 5,664,429 | A | * | 9/1997  | Isaji ............................. 62/278 |
| 6,000,912 | A | * | 12/1999 | Takada et al. ................ 417/32 |

FOREIGN PATENT DOCUMENTS

| DE | 42 43 654   |   | 7/1993  |           |
| EP | 443585 A2   | * | 8/1991  | .......... H02P/7/628 |
| EP | 0 696 842   |   | 2/1996  |           |
| JP | 1268487 A   | * | 10/1989 | ............ H02P/7/63 |
| JP | 2-68672     |   | 5/1990  |           |
| JP | 3-93494     |   | 4/1991  |           |
| JP | 6-76665     |   | 10/1994 |           |
| JP | 6-335291    |   | 12/1994 |           |
| JP | 7-115787    |   | 5/1995  |           |
| JP | 8-66083     |   | 3/1996  |           |
| JP | 8-172789    |   | 7/1996  |           |
| JP | 08 247087   |   | 9/1996  |           |
| JP | 08 254195   |   | 10/1996 |           |
| JP | 8-256492    |   | 10/1996 |           |
| JP | 9-149691    |   | 6/1997  |           |

* cited by examiner

*Primary Examiner*—Thomas Black
*Assistant Examiner*—Crystal Barnes
(74) *Attorney, Agent, or Firm*—Armstrong, Westerman & Hattori, LLP

(57) ABSTRACT

The present invention provides a rotary machine integrated with a control device, which is effective to reduce the cost of manufacture of a variable-speed pump or the like, and allows control programs to be easily established at the installation site. The present invention also provides an inverter device suitable for the above mentioned rotary machine. A rotary machine and control device combination comprises a rotary machine such as a pump, a fan, or the like and a control device integral therewith. The rotary machine has an inverter device for operating the rotary machine, a memory for storing a control program for the inverter device and a program for controlling operation of the rotary machine, a CPU operable according to the programs stored in the memory, an input and output unit connected to sensors and switches positioned in the rotary machine, one or more serial ports (14) connected to the CPU (12), and device for rewriting contents stored in the memory (11). The memory stores a plurality of control programs, there is a device for externally selecting a control program to be used among the stored control programs. The inverter device has a circuit board with circuit components encased by molded resin, with only input and output lines and interface terminals being disposed outside of the molded resin.

9 Claims, 12 Drawing Sheets

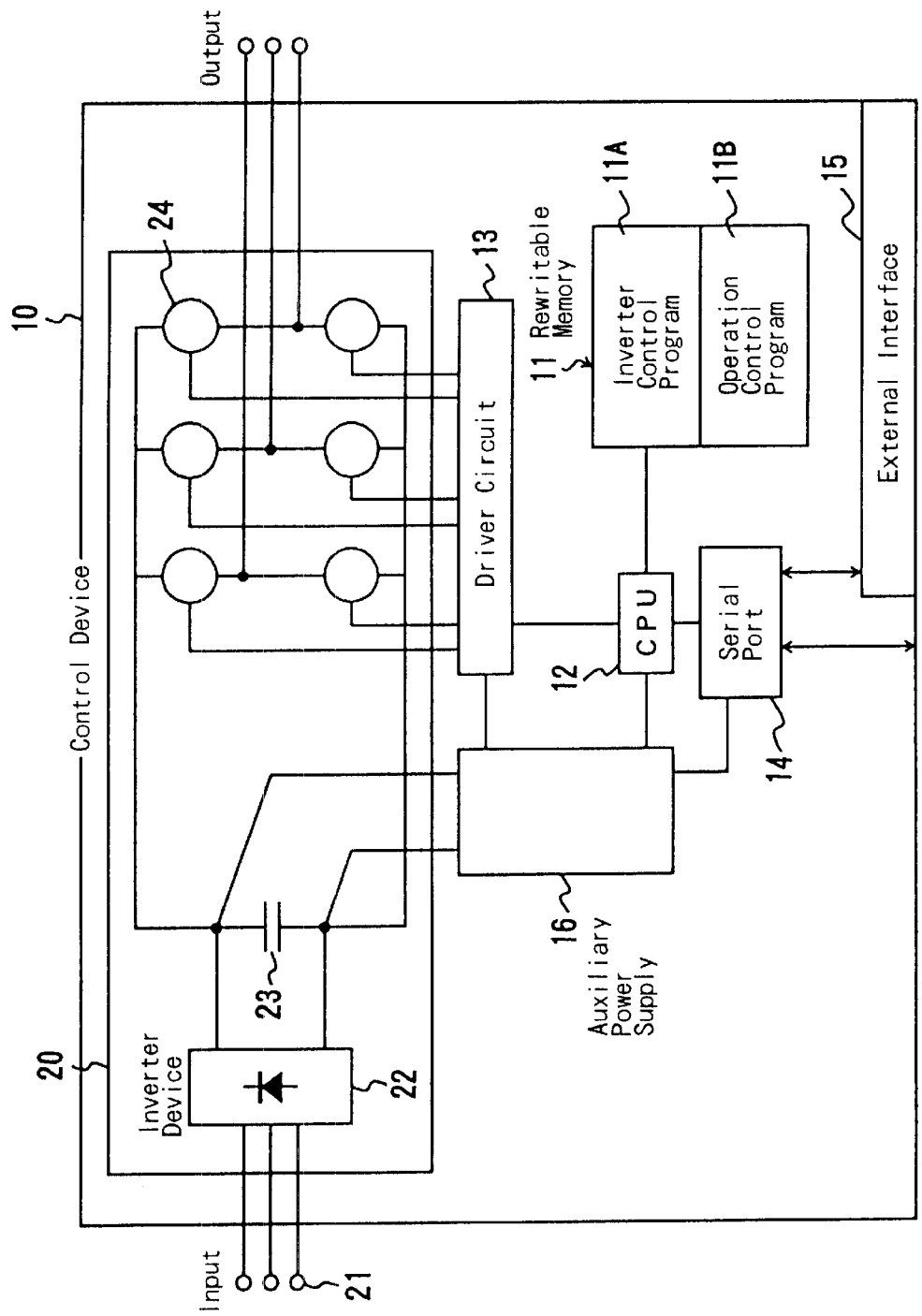

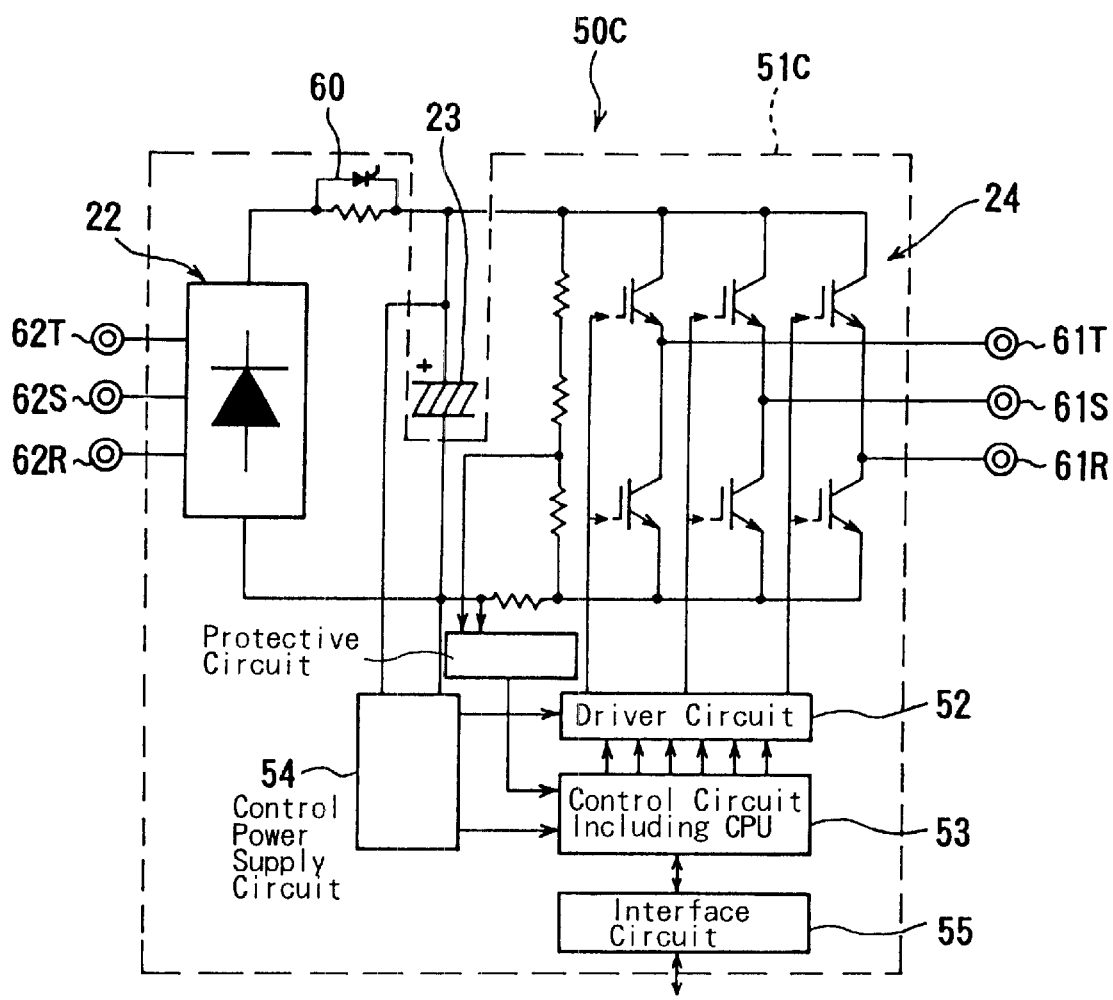
F I G. 10

F I G. 1 1
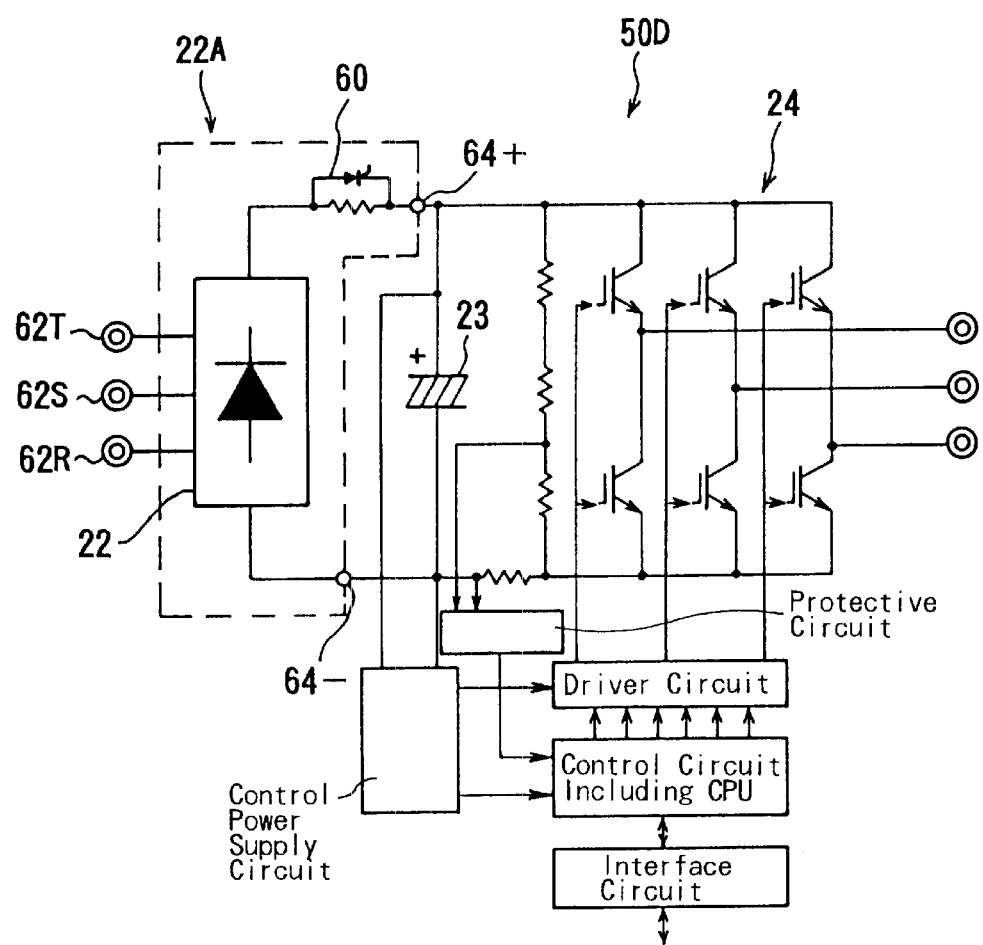

ROTATING MACHINE INTEGRATED WITH CONTROLLER, AND INVERTER

TECHNICAL FIELD

The present invention relates to a rotary machine integral with a control device, and more particularly to a rotary machine and control device combination which comprises a rotary machine such as a pump, a fan, or the like and an operation control device such as an inverter device for controlling the rotational speed of the rotary machine.

BACKGROUND ART

It has widely been practiced to combine a rotary machine such as a pump, a fan, or the like with an inverter device for converting the frequency and voltage of a commercial AC power supply into an arbitrary frequency and voltage thereby to control the rotary machine to rotate at a variable speed. Since the inverter device is capable of changing the rotational speed of a motor which actuates the pump or fan, the inverter device can operate the pump or fan at a rotational speed optimum for the load on the pump or fan, and hence can save more energy as compared with operating the pump or fan at a rated speed.

It is known that various water supply apparatus are operated according to a constant pump discharge pressure control process. In the constant pump discharge pressure control process, a pressure sensor is located-at the outlet port of a pump, and a PI controller sends a rotational speed signal to an inverter device in order to equalize a detected signal from the pressure sensor to a pressure setting. The inverter device controls the rotational speed of a pump to control the discharge pressure of the pump at a constant level. It is also known that various water supply apparatus are operated according to a constant estimated terminal discharge pressure control process. In the constant estimated end discharge pressure control process, a target pump discharge pressure is successively changed on the basis of a flow sensor signal or a rotational speed for thereby controlling the water pressure supplied to an end consumer at a constant level.

Furthermore, it is known that air-conditioning systems or the like are operated according to a constant temperature control process. In the constant temperature control process, a temperature sensor is located at the outlet port of a fan, and a PI controller controls an inverter device to control the rotational speed of the fan in order to coincide the temperature of air discharged by the fan with a predetermined temperature setting.

If a variable-speed pump or variable-speed fan which is equipped with such an inverter device is incorporated in a water supply apparatus or an air-conditioning system, then the variable-speed pump or variable-speed fan needs to be operated according to various control processes. For example, if such a variable-speed pump is incorporated in a water supply apparatus, then the variable-speed pump is operated or stopped by an operation or stop command sent from a control station remote from the pump. These operation statuses need to be displayed. For automatically operating the pump to keep the discharge pressure constant, it is necessary to supply a signal from a pressure sensor at the outlet port of the pump to a control device in the water supply apparatus, so that the control device controls the rotational speed of the pump under variable-speed control to keep the discharge pressure constant. When an amount of water to be supplied, which represents a load on the pump, becomes very small, since the pump would otherwise operate in a shut-off mode, it is necessary to store water in a pressure tank connected to the outlet port of the pump and stop the pump.

Therefore, if a variable-speed pump equipped with an inverter device is incorporated in a water supply apparatus, then the water supply apparatus needs an operation control device which generally comprises a CPU and a memory.

Operation control specifications for a water supply apparatus which employs a variable-speed pump vary greatly depending on conditions of the installation site. Therefore, data to be stored in the memory for controlling the operation of the water supply apparatus need to be set depending on facility details at the installation site. Actually, the operation control device requires a CPU and a memory for controlling the inverter device, and a CPU and a memory for controlling the pump. However, it has been difficult to employ a common CPU and a common memory for those CPUs and memories because of the facility details at the installation site. Since the operation control details vary from pump type to pump type and also from operation control condition to operation control condition at the installation site, it is necessary to use memories (ROMs or the like) storing programs suitable for the operation control specifications.

In the water supply apparatus, furthermore, if facilities are to be added or modified to meet demands for an increased amount of water to be supplied, for example, then data stored in the memories need to be changed accordingly. However, it has not been easy to change the data stored in the memories because the control data are stored in the ROMs or the like.

DISCLOSURE OF INVENTION

The present invention has been made in view of the above conventional drawbacks. It is an object of the present invention to provide a rotary machine integral with a control device, which is effective to reduce the cost of manufacture of a water supply apparatus or the like employing a variable-speed pump or the like, and allows control programs to be easily established at the installation site.

According to a first aspect of the present invention, there is provided a rotary machine and control device combination which comprises a rotary machine such as a pump, a fan, or the like and a control device integral therewith, the control device comprising an inverter device for operating the rotary machine, a memory for storing a control program for the inverter device and a program for controlling operation of the rotary machine, a CPU operable according to the programs stored in the memory, an input and output unit connected to sensors and switches positioned in said rotary machine, one or more serial ports connected to the CPU, and means for rewriting contents stored in the memory.

The memory may store the control program for the inverter and the program for controlling operation of the rotary machine.

The memory may comprise a flash memory.

The rotary machine and control device combination may comprise a plurality of rotary machines and control devices integral therewith, with the rotary machines having serial ports connected to each other for coordinated operation according to a machine adding and relieving process, an alternate machine operating process, and a failure machine-switching process.

An electronic circuit section including the memory and the CPU of the control device may be encased by molded resin.

With the above rotary machine and control device combination, since the control device has the means for rewriting contents stored in the memory based on a signal entered from the serial port or ports, both a control program for the inverter and an operation program for starting and stopping the rotary machine can be written into the memory. Because only one set of a memory and a CPU, rather than two sets of memories and CPUs that have heretofore been required, is sufficient, the cost of manufacture of the control device is reduced.

Since the memory is associated with the means for rewriting the programs stored therein, the control program can be modified to suit the operating status of the rotary machine at the installation site, and only one set of hardware is needed to provide a water supply apparatus that can be controlled by software to meet demands under various different operating conditions. Therefore, the hardware arrangement can be mass-produced and hence its cost can be lowered. Furthermore, the user of the rotary machine can easily add a pump, for example, to meet a change in the demand for water to be supplied from the water supply apparatus. Therefore, the rotary machine can be made highly flexible for the user.

According to a second aspect of the present invention, there is provided a rotary machine and control device combination which comprises a rotary machine such as a pump, a fan, or the like and a control device integral therewith, the control device comprising an inverter device for operating the rotary machine, a memory for storing a plurality of control programs, a CPU operable according to the programs stored in the memory, an input and output unit connected to sensors and switches positioned outside of the control device, one or more serial ports connected to the CPU, and means for externally selecting a control program to be used among the control programs.

The memory may store a control program for the inverter and a program for controlling operation of the rotary machine.

The rotary machine and control device combination may comprise a plurality of rotary machines and control devices integral therewith, with the rotary machines having serial ports connected to each other for coordinated operation according to a machine adding and relieving process, an alternate machine operating process, and a failure machine-switching process.

An electronic circuit section including the memory and the CPU of the control device may be encased by molded resin.

With the above rotary machine and control device combination, since the control device has the means for selecting a control program to be used among the control programs stored in the memory, and switching programs to operate the CPU with the selected program, it is possible to select a control program most suited to the type of the pump or operating conditions of the installation site. Therefore, pump control devices having a plurality of control programs may be mass-produced in advance, and it is possible to select, at the installation site, a necessary control program to be used among those control programs. Only one set of hardware is needed to provide a water supply apparatus that can be controlled by software to meet demands under various different operating conditions. Therefore, the hardware arrangement can be mass-produced and hence its cost can be lowered. Furthermore, the user of the rotary machine can meet specifications of many types manufactured in small lots at the installation site. Furthermore, the user can easily add a pump, for example, to meet a change in the demand for water to be supplied from the water supply apparatus. Therefore, the rotary machine can be made highly flexible for the user.

According to a third aspect of the present invention, there is provided an inverter device which comprises an inverter section having a power device, a driver circuit for operating the power device, a control circuit including a CPU for controlling the driver circuit, and an interface circuit, the inverter section being mounted on a circuit board, the circuit board with the circuit components thereon being encased by molded resin, with only input and output lines and interface terminals being disposed outside of the molded resin.

The molded resin may accommodate a protective circuit for monitoring an operating status thereof and protecting.

The molded resin may further accommodate a converter section comprising a rectifier, and a rush current prevention circuit.

The inverter device may comprise a converter section comprising a rectifier and a rush current prevention circuit, wherein the converter section is mounted on a circuit board, and the circuit board with the circuit components thereon are encased by molded resin, with only input and output lines disposed outside of the molded resin.

The inverter device may comprise a combination of resin-encased module of the inverter section and a resin-encased module of the converter section, with a capacitor connected between the converter section and the inverter section.

The control circuit may have an electrically rewritable memory for storing a program, the program stored in the electrically rewritable memory being rewritable from outside of the molded resin via the interface circuit.

BRIEF DESCRIPTION OF DRAWINGS

FIG. 1 is a block diagram of a control device according to a first embodiment of the present invention;

FIG. 10 is a circuit diagram of an inverter device according to still another embodiment of the present invention;

FIG. 11 is a circuit diagram of an inverter device according to yet another embodiment of the present invention;

BEST MODE FOR CARRYING OUT THE INVENTION

Figure 2:
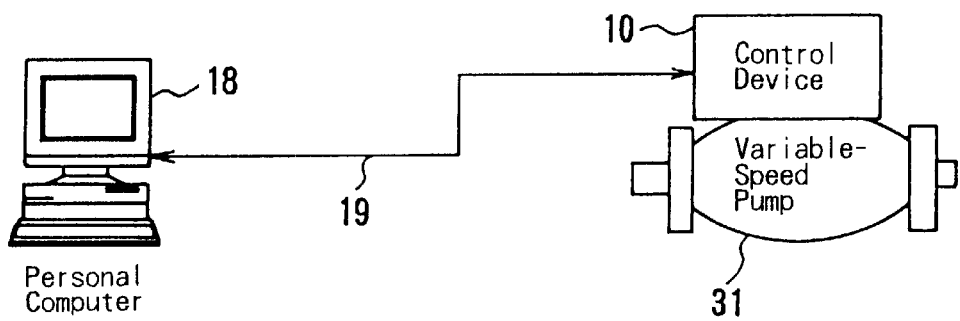
FIG. 2 is a view of a hardware arrangement for rewriting data in a flash memory.

FIG. 1 is a block diagram showing the arrangement of a control device according to a first embodiment of the present invention. The control device 10 includes an inverter device 20. The inverter device 20 comprises a diode bridge circuit 22 which operates as a converter section for rectifying a commercial three-phase AC power supply input 21, a capacitor 23 for storing and smoothing a DC electric power rectified by the diode bridge circuit 22, and a power device assembly 24 which operates as an inverter section for converting the DC electric power stored in the capacitor 23 into an AC electric power having an arbitrary frequency and voltage. The power device assembly 24 comprises power devices such as power MOS devices, IGBTs, etc. and generates an AC electric power output having an arbitrary frequency and voltage when the power devices are opened and closed. The power devices are opened and closed by a process of pulse width modulation which is performed by an inverter control program 11A stored in a rewritable memory 11 via a CPU 12 and a driver circuit 13.

The control device 10 also includes a rewritable memory 11 which stores an inverter control program 11A and an operation control program 11B, and a CPU 12 for carrying out arithmetic and control operations based on the programs stored in the memory 11. The memory 11 comprises a flash memory. The control device 10 has a serial port 14 for supplying signals from an external circuit via a communication line to the CPU 12. The serial port 14 is connected to an external interface 15 which, if the control device 10 is incorporated in a water supply apparatus, is connected to a pressure sensor for detecting the discharge pressure of a pump, and reads a signal from the pressure sensor. The external interface 15 has a terminal for receiving a switching signal indicative of whether the pump is to operate automatically or manually, terminals for receiving input signals from sensors for detecting various malfunctions, and terminals for supplying output signals to display various warnings. An auxiliary power supply 16 serves to supply a DC electric power of about 5 V to operate the CPU 12 and the serial port 14. The auxiliary power supply 16 generates the low-voltage DC electric power from the DC voltage across the capacitor 23 with a DC/DC converter or the like.

Since the control device 10 stores both the inverter control program and the operation control program for the water supply apparatus, the control device 10 alone is capable of controlling both the inverter device and the water supply apparatus. Two variable-speed pumps each combined with the control device 10 are connected parallel to an inlet pipe and an outlet pipe, and have respective serial ports connected to each other. When the capacity of one pump is not enough to meet the water demand, the other pump is added for operation. When the total capacity of the two pumps is excessive, one of the pumps is relieved. Such a pump adding and relieving process can be performed by the operation control program of one of the control devices 10. Similarly, a pump-operating process can also be carried out such that when one pump stops due to the demand for a small amount of water to be supplied, after then the other pump starts to operate due to the demand of water to be supplied. Also, a failure pump-switching process can also be carried out when one pump stops due to a failure, the other pump automatically starts to operate in response to a failure signal. Communications via the serial ports can be performed using a radio link.

FIG. 2 shows a hardware arrangement for rewriting data in a flash memory. A personal computer 18 is connected by a communication cable 19 to a variable-speed pump 31 having a control device 10 which is placed at an installation site. Specifically, the personal computer 18 and the control device 10 are interconnected using a cable according to communication standard RS232C or the like. The communication cable 19 is connected to the serial port 14 of the control device 10. The personal computer 18 stores therein inverter control programs suited to various inverter specifications and control programs for water supply apparatus of various specifications. The personal computer 18 selects programs optimum for facility details at the installation site and loads the selected programs into the flash memory 11 in the control device 10.

Figure 3:
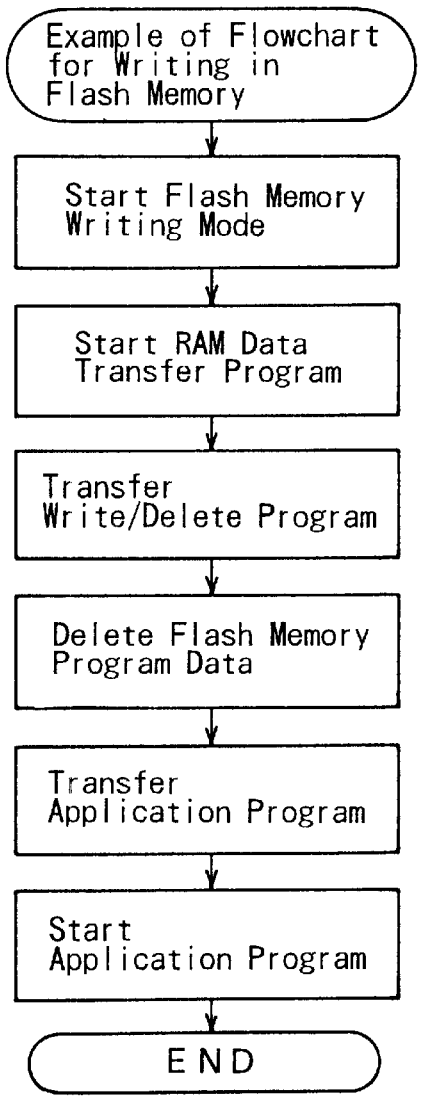
FIG. 3 is a flowchart for rewriting data in the flash memory.

FIG. 3 shows a flowchart for rewriting the flash memory. First, a flash memory write mode is started. That is, while the CPU of the control device 10 is being reset, a DC voltage of 12 V is applied to a power supply terminal of the CPU to cancel the reset state thereof. Then, a RAM data transfer program is started, and thereafter a write/delete program transfer process is started. Specifically, a write/delete program is transferred to a RAM which is incorporated in or externally connected to the CPU, and then started. Thereafter, a flash memory program data deleting process is carried out. That is, flash memory program data is deleted from one block area at a time or from all block areas at once. Then, an application program transferring process is carried out. Specifically, application programs, which have been prepared in advance for transfer by the personal computer as described above, are transferred to the block areas of the flash memory from which the program data has been deleted. Then, the transferred application programs are started. Specifically, the DC voltage of 12 V applied to the power supply terminal of the CPU is turned off, and the CPU is reset to start, whereupon the transferred application programs are started.

While the flash memory has been described as a rewritable memory, an electrically rewritable memory such as EEPROM or the like may be employed in place of the flash memory. In the above embodiment, the CPU and the rewritable memory are combined with each other. However, a memory may be removably inserted in a socket, and a memory storing modified program data may be inserted into the socket to replace the existing memory.

According to the present invention, as described above, since the inverter control program and the rotary machine operation control program can be rewritten via the serial port, the rotary machine of one hardware arrangement can be controlled to operate to meet demands at various different installation sites. Since the hardware arrangement may be of one design, it can be mass-produced and hence its cost can be lowered. Furthermore, because software data can be written into the control device at the installation site, the rotary machine can be optimally controlled for operation depending on the facility details at the installation site. The operation program can easily be changed at the installation site when facilities are added after the facility installation. Therefore, the rotary machine can be made highly flexible for the consumer.

Figure 4:
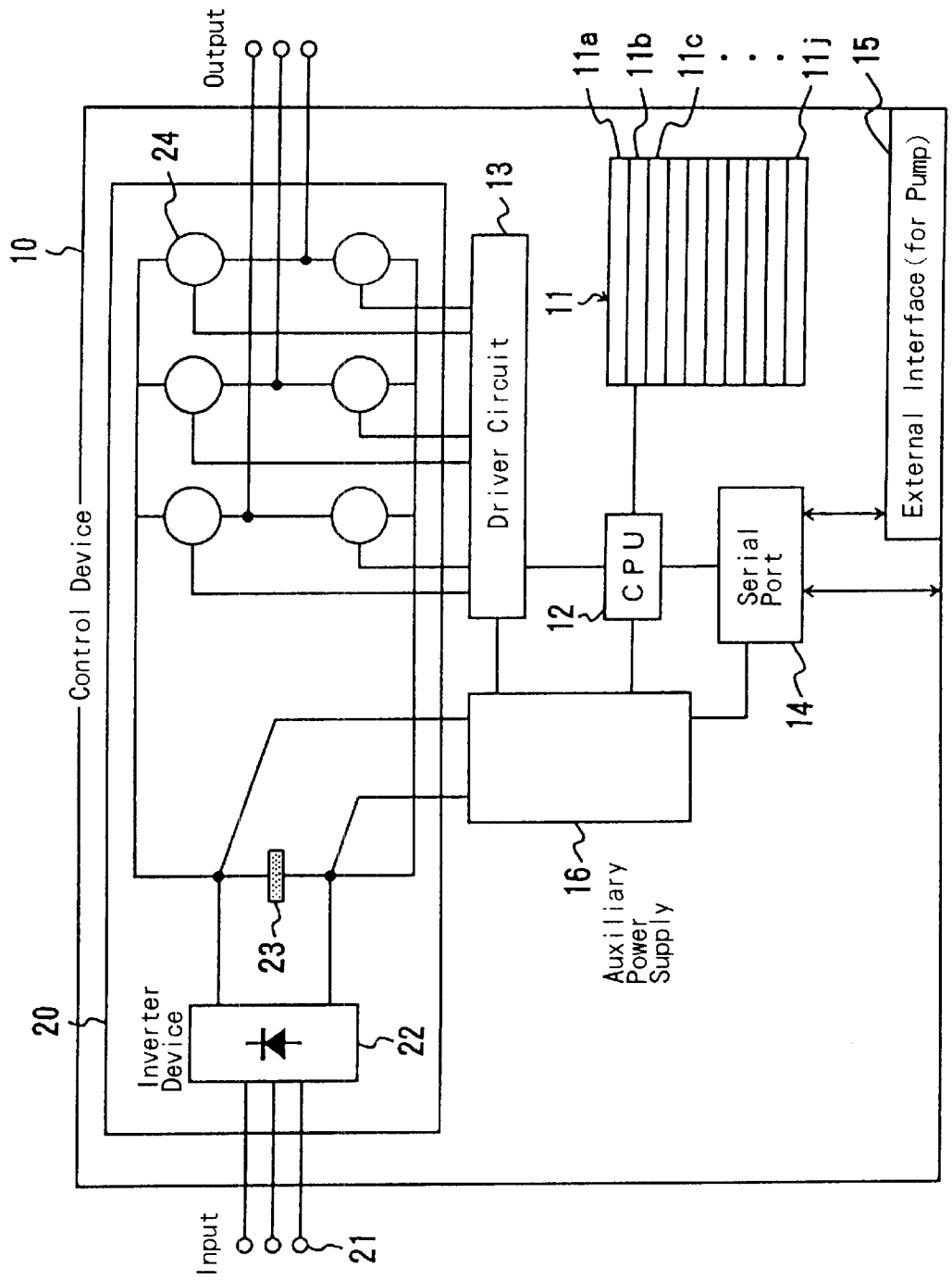
FIG. 4 is a block diagram of a control device according to a second embodiment of the present invention.

FIG. 4 is a block diagram of a control device according to a second embodiment of the present invention. The control device 10 is similar to the control device according to the first embodiment in that it includes an inverter device 20. The inverter device 20 comprises a diode bridge circuit 22 which operates as a converter section for rectifying a commercial three-phase AC power supply input 21, a capacitor 23 for storing and smoothing a DC electric power rectified by the diode bridge circuit 22, and a power device assembly 24 which operates as an inverter section for converting the DC electric power stored in the capacitor 23 into an AC electric power having an arbitrary frequency and voltage. The power device assembly 24 comprises power devices such as power MOS devices, IGBTs, etc. and generates an AC electric power output having an arbitrary frequency and voltage when the power devices are opened and closed. The power devices are opened and closed by a process of pulse width modulation which is performed by an inverter control program stored in a memory 11 via a CPU 12 and a driver circuit 13.

The control device 10 also includes a memory 11 which stores a plurality of inverter control programs and a plurality of operation control programs, and a CPU 12 for carrying out arithmetic and control operations based on the programs stored in the memory 11. The control device 10 has a serial port 14 for supplying signals from an external circuit via a communication line to the CPU 12. Communications via the serial port can be performed using a radio link. The serial port 14 is connected to an external interface 15 having a terminal for receiving a switching signal indicative of whether a pump is to operate automatically or manually, terminals for receiving input signals from sensors and for detecting various malfunctions, and terminals for supplying output signals to display various warnings. An auxiliary power supply 16 serves to supply a DC electric power of about 5 V to operate the CPU 12 and the serial port 14. The auxiliary power supply 16 generates the low-voltage DC electric power from the DC voltage across the capacitor 23 with a DC/DC converter or the like.

The memory 11 comprises a read-only memory (ROM) or an electrically erasable programmable read-only memory (EEPROM) which stores various inverter control programs and pump operation control programs 11a, 11b, 11c, . . . , 11j. The memory 11 and the CPU 12 may be mounted on one semiconductor chip. Various programs stored in the memory 11 may arbitrarily be selected and used depending on the type of the pump or operation conditions thereof. In this embodiment, a soft switch is used to perform software-implemented program switching based on a signal entered via the serial port 14. However, a hardware switch may be connected to the memory 11 to perform program switching.

In this embodiment, programs are selected to effect a constant pressure control process or a constant estimated terminal discharge pressure control process, and the programs are also effective to a pump stopping mode that pump stops when a small water supply is demanded.

Figure 5:
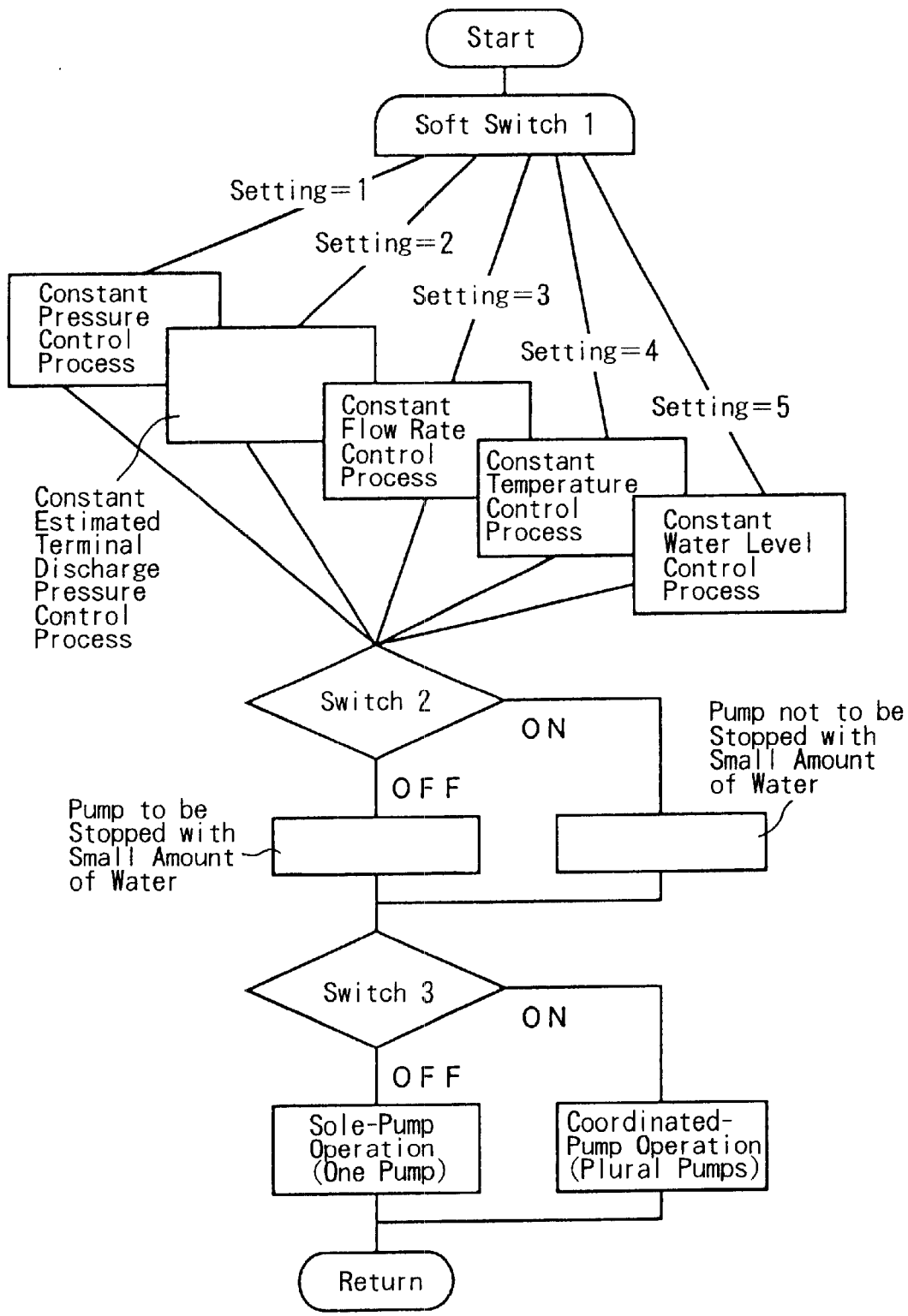
FIG. 5 is a flowchart of an example for switching between control programs using a soft switch.

FIG. 5 shows an example of various control programs selectable by a soft switch. For example, a soft switch 1 can switch, with settings, a constant pressure control process (setting=1), a constant estimated terminal discharge pressure control process (setting=2), a constant flow rate control process (setting=3), a constant temperature control process (setting=4), a constant water level control process (setting=5), etc. A soft switch 2 can select a pump stopping mode upon a small water supply demand or not, and a soft switch 3 can switch between a sole-pump (one pump) operation mode and a coordinated-pumps (plural pumps) operation mode.

Figure 6:
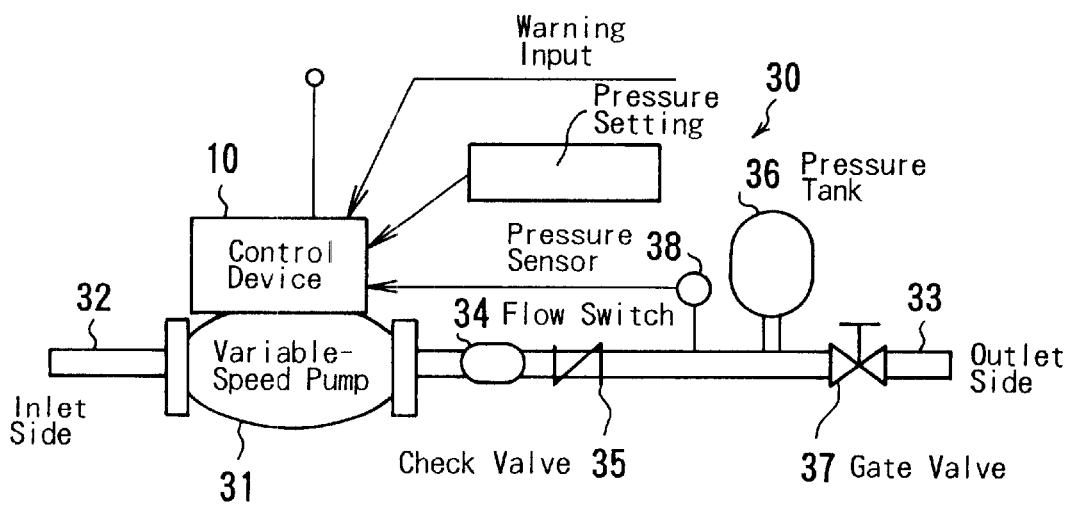
FIG. 6 is a view showing an example in which a rotary machine integral with a control device according to the present invention is used.

FIG. 6 is a view showing an example in which the control device according to the first or second embodiment is applied, the control device being used in a water supply apparatus. The water supply apparatus 30 employs an inverter-operated variable-speed pump 31 to which the control device 10 incorporating an inverter device is fixedly coupled. The control device 10 is accommodated in a closed housing fixedly coupled to a casing of the pump 31. The control device 10 has a circuit board supporting a CPU, a memory, etc. and encased by molded resin. The control device 10 thus constructed is compact in structure and prevents electronic parts from malfunctioning due to moisture condensation.

The variable-speed pump 31 has an inlet port connected to a water main (not shown) by an inlet pipe 32 and an outlet port connected via flow switch 34, a check valve 35, and a gate valve 37 to supply tap water to end consumers such as at homes. The flow switch 34 serves to detect a small amount of water. The check valve 35 serves to prevent water from flowing back from the discharge side of the pump to the supply side thereof when the pump stops.

A pressure tank 36 is connected to an outlet pipe 33. When the flow switch 34 detects a small amount of discharged water, the pressure tank 36 stores the discharged water, and the variable-speed pump 31 is stopped in operation. In this manner, the variable-speed pump 31 is prevented from operating in a shut-off mode. A pressure sensor 38 is connected to the outlet pipe 33 for detecting a water pressure in the outlet pipe 33. The pressure sensor 38 supplies an output signal to the control device 10 via an external interface. The control device 10 is supplied with a setting for the discharge pressure or a setting for the pressure to be supplied to end consumers via the serial port. The control device 10 controls the rotational speed of the variable-speed pump 31 to achieve such a setting as a target value. The control device 10 is also supplied with various warnings. For example, the variable-speed pump 31 is equipped with a temperature meter, and when the temperature of the variable-speed pump 31 is unduly increased, the control device 10 immediately stops the operation of the variable-speed pump 31 or generates a warning which is sent to a supervising section.

Two variable-speed pumps each combined with the control device 10 are connected parallel to the inlet pipe 32 and the outlet pipe 33, and have respective serial ports connected to each other by a communication line. A program for operating the two pumps parallel (coordinated operation) is selected. When the capacity of one pump is not enough to meet the water demand, the other pump is added for operation. When the total capacity of the two pumps is excessive, one of the pumps is relieved. Such a pump adding and relieving process can be performed by the operation control program of one of the control devices 10. Similarly, a pump-switching process can also be carried out such that when one pump stops due to the demand for a small amount of water to be supplied, after then the demand is increased, the other pump starts to operate, and that when one pump stops due to a failure, the other pump automatically starts to operate in response to a failure signal. Communications via the serial ports can be performed using a radio link.

Figure 7:
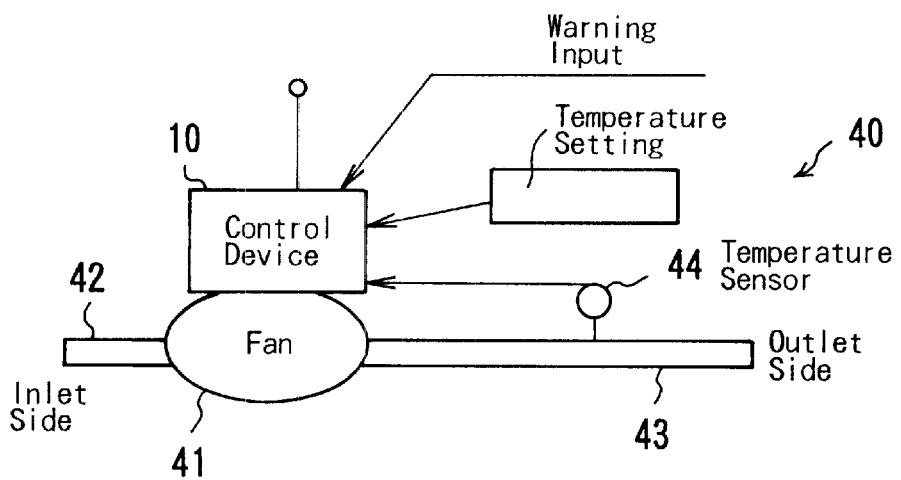
FIG. 7 is a view showing an example in which a rotary machine integral with a control device according to the present invention is used.

FIG. 7 is a view showing an example in which the above control device is applied, the control device being used in an air-conditioning system 40. The air-conditioning system has a variable-speed fan 41 which is controlled by the control device 10. The variable-speed fan 41 is connected to an inlet duct 42 and an outlet duct 43, and serves to supply cooled or heated air to a discharge side, i.e., a room (not shown). To keep the room temperature at a constant level, a temperature sensor 44 is connected to the outlet duct 43 for detecting the temperature of air in the outlet duct 43. A temperature setting is entered, in advance, into the control device 10 via an external interface 15. The control device 10 compares the temperature setting and the actual temperature detected by the temperature sensor 44 with each other, and controls the rotational speed of the fan 41 in order to equalize the actual temperature to the temperature setting.

The control device 10 controls the rotational speed of the fan 41 according to a selected operation control program in the memory 11 by increasing or reducing the rotational speed in order to eliminate the difference between the temperature setting and the detected temperature under PI control. According to the inverter control program, the CPU determines a pulse duration depending on the rotational speed determined by the operation control program, and outputs a pulse-width-modulated signal which is supplied via the driver circuit 13 to turn on and off the power devices 24 thereby to supply an AC electric power having a given frequency and voltage to the motor.

The fan 41 is associated with a temperature sensor (not shown), for example. When the fan 41 is abnormally heated, the output signal from the temperature sensor is read via the external interface 15 into the CPU, which stops the fan or issues a warning. A program for performing such an action may be stored in the memory, and may be selected, or may newly be written into the memory.

While a variable-speed pump and a variable-speed fan have been described as objects to be controlled by the control device, the present invention is not limited to such a pump and a fan, but may be applicable to rotary machines which are controlled for their rotation by an inverter device and to control devices for controlling such rotary machines.

As described above, an inverter device for use in such a control device generally has a converter section comprising a rectifier circuit such as a diode module or the like for converting an AC electric power as from a commercial AC power supply, a capacitor for smoothing the rectified AC electric power and storing the smoothed DC electric power, and an inverter section for converting the DC electric power stored in the capacitor back into an AC electric power having an arbitrary frequency and voltage. Generally, the converter has a rush current prevention resistor or a rush current prevention circuit comprising a magnet switch, a thyristor, or the like. The inverter section comprises power devices such as power MOS devices, IGBTs, etc., a driver circuit for energizing the power devices, a control circuit comprising a CPU, a memory, etc. for supplying opening and closing signals for the power devices to the driver circuit, a control power supply circuit for supplying a DC electric power of +5 V, for example, to the control circuit, and a protective circuit for protecting the power devices against an overvoltage or an overcurrent.

Various circuit components of the inverter device are usually mounted on a single circuit board having terminal bases which include an input terminal base connected to a commercial AC power supply and an output terminal base connected to power supply input lines of a motor which operates a pump or a fan. The CPU, the memory, etc. of the control circuit are replaceably inserted in sockets that are mounted on the circuit board for the convenience of maintenance. The circuit board with the circuit components mounted thereon is generally housed in a casing which has heat-radiating fins, fans, or the like disposed therein for cooling the power devices that dissipate a large amount of heat.

The casing generally has a control display panel for displaying an operating frequency and various warnings. The inverter has an interface for connection external to the casing, so that it can receive an inverter control signal from an external source and output a warning signal at the time the protective circuit detects a malfunction. It has been customary to assemble a conventional inverter device by purchasing the circuit components, installing the circuit components on a circuit board, and wiring and connecting the circuit components with various connectors.

An inverter device according to a third embodiment of the present invention will hereinafter be described with reference to the drawings.

Figure 8:
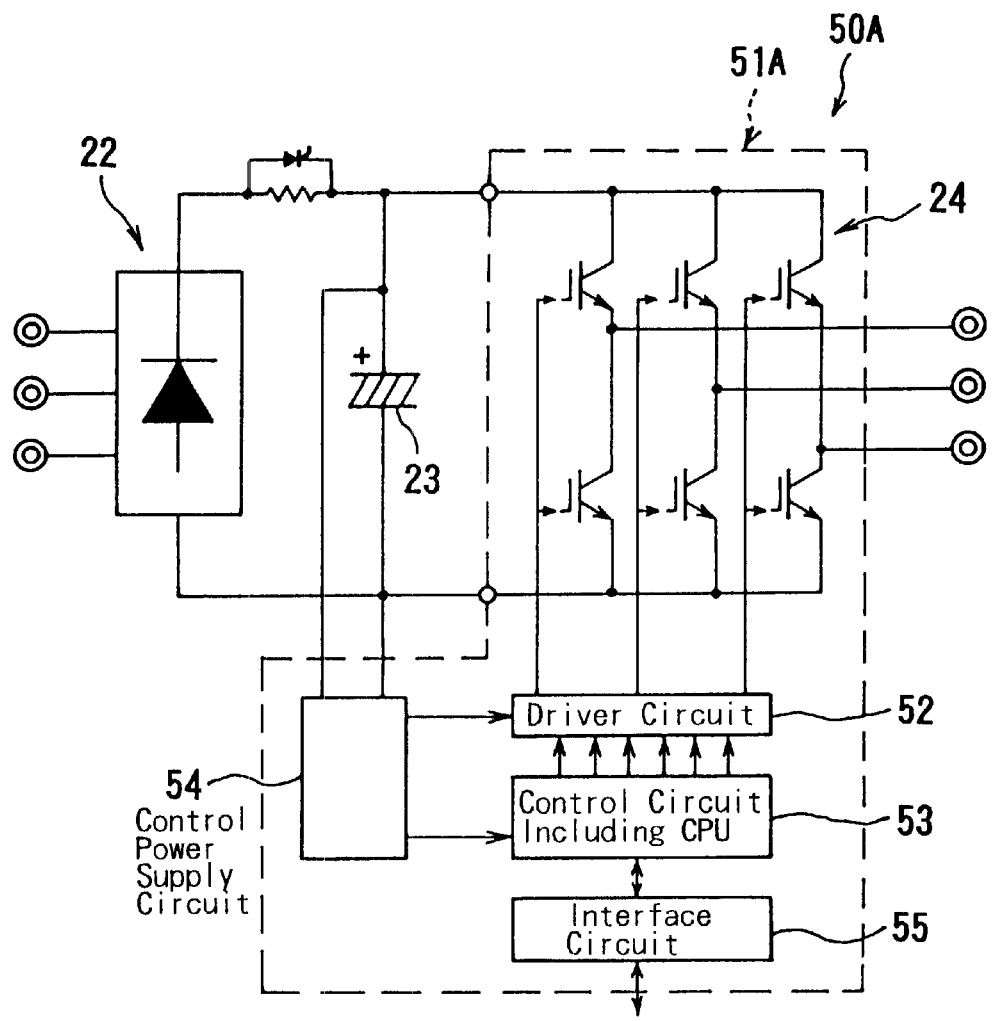
FIG. 8 is a circuit diagram of an inverter device according to a third embodiment of the present invention.

FIG. 8 is a circuit diagram of an inverter device according to a third embodiment of the present invention. The inverter device 50A comprises a converter section 22 comprising a diode module of bridge-connected rectifiers for rectifying a commercial three-phase AC power supply, a capacitor 23 for smoothing the rectified AC electric power and storing the smoothed DC electric power, and an inverter section 51A for inverting the DC electric power stored in the capacitor 23 back into an AC electric power having an arbitrary frequency and voltage. The inverter section 51A is encased into an integral module by molded resin. Specifically, the inverter section 51A comprises a power device assembly 24 comprising power devices such as IGBT's, power transistors, etc., a driver circuit 52, a control circuit 53 including a CPU, a control power supply circuit 54 for supplying a DC electric power of +5 V or the like to the control circuit, and an interface circuit 55 for connecting the control circuit 53 to external signal lines. These circuits of the inverter section 51A are mounted on a single circuit board and encased into a module by molded resin. Output lines for connection to the motor and lines connected to the capacitor and the converter section extend directly from the molded resin. Connection terminals of the interface circuit are disposed outside of the molded resin, and connected to the control circuit in the molded resin.

Figure 9:
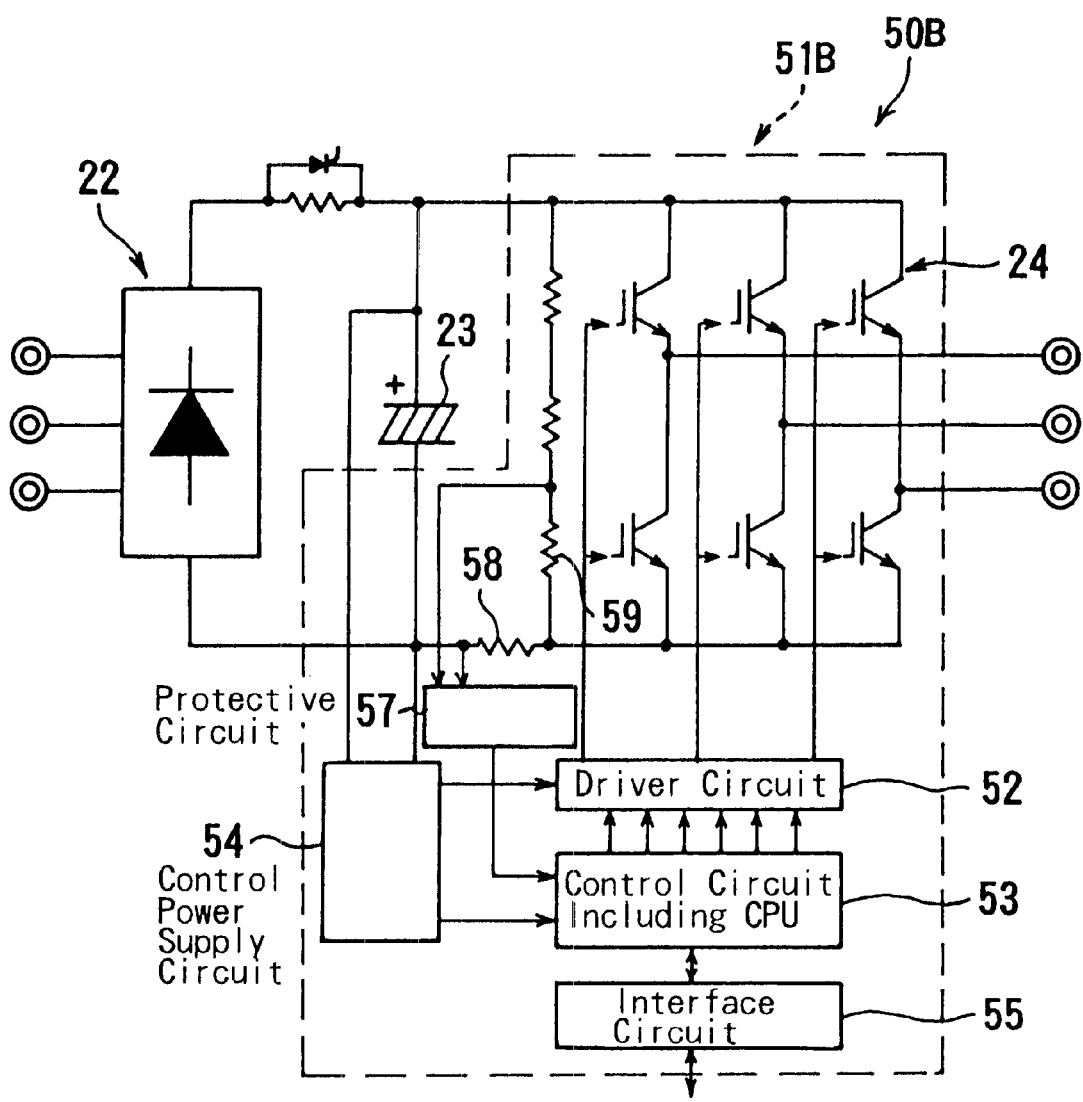
FIG. 9 is a circuit diagram of an inverter device according to another embodiment of the present invention.

FIG. 9 shows an inverter device 50B, which is moduled in a molded resin including inverter section and protective circuits. A protective circuit 57 detects an overcurrent from a current-detecting resistor 58 inserted between a capacitor 23 and an inverter section 51B, and also detects an overvoltage across a resistor 59 connected parallel to a DC section of the inverter device 50B. When the protective circuit 57 detects an overcurrent or an overvoltage, the protective circuit 57 sends a detected signal to the control circuit 53 including a CPU to enable the control circuit 53 to perform a protective action as by stopping the operation of the inverter device.

FIG. 10 shows an inverter device 50C which is encased, together with the converter 22, a rush current prevention circuit 60 and an inverter section 5 IC, into an integral module by molded resin. The converter 22 comprises bridge-connected rectifiers (diodes) for rectifying a commercial three-phase AC power supply into a DC electric power by way of full-wave rectification. The rush current prevention circuit 60 serves to protect various circuit components against an excessive surge current which rushes in when a load device such as a pump starts to operate. The rush resistor and a bypass circuit such as a thryristor which are inserted parallel to each other. All the circuit components, except the capacitor 23, of the inverter device 50C are encased into a single module by molded resin.

Figure 15:
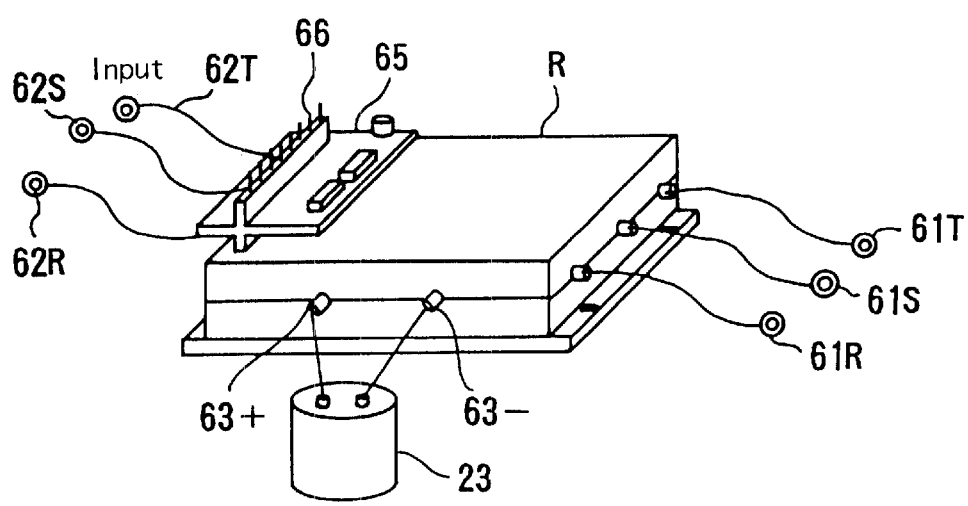
FIG. 15 is a perspective view of an inverter device.

FIG. 15 shows an appearance of this embodiment. A molded block R of resin has ports 61R, 61S, 61T for passing output lines connected to a motor and ports 62R, 62S, 62T for passing input lines connected to a commercial AC power supply. Similarly, the molded block R of resin has ports 63+, 63− for passing connector lines connected to the capacitor 23. An interface board 65 is disposed outside of the molded block R of resin and has interface terminals 66 for connection to external signal lines. Connection lines of the interface terminals 66 are connected to a CPU of a control circuit which is encased in the molded block R of resin.

Since circuit components including the CPU are encased in the molded block R of resin, they are shielded from moisture condensation and can operate normally. Even if there is a temperature difference as when the inverter device is directly installed on the casing of the pump, the inverter device can easily be installed without the need for any special countermeasures against moisture condensation. Therefore, the inverter device can be reduced in cost and size.

FIG. 11 shows an inverter device 50D with a converter section 22 separated from an inverter section, installed on a separate circuit board, and assembled as an integral module. Specifically, the diode module 22 and the rush current prevention circuit 60 are encased in a molded block R of resin, which has ports 62R, 62S, 62T for connection to a commercial AC power supply and ports 64+, 64− for connection to the inverter section.

Figure 12:
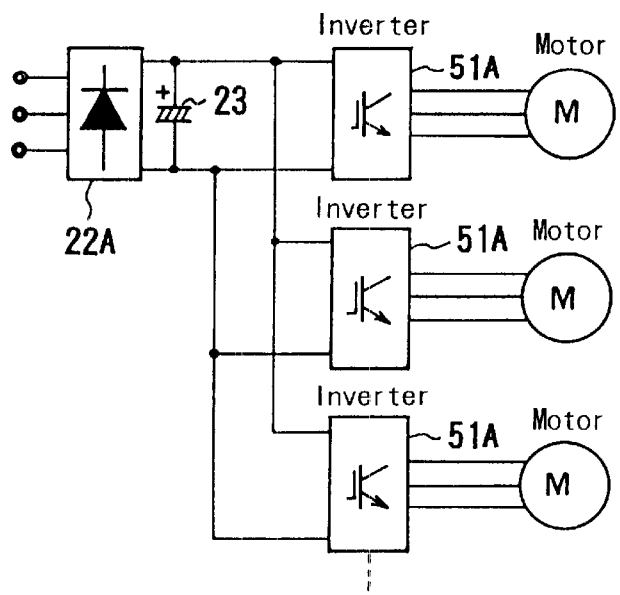
FIG. 12 is a circuit diagram of an inverter device which comprises a set of a converter section and a capacitor and a plurality of inverter sections.
Figure 16:
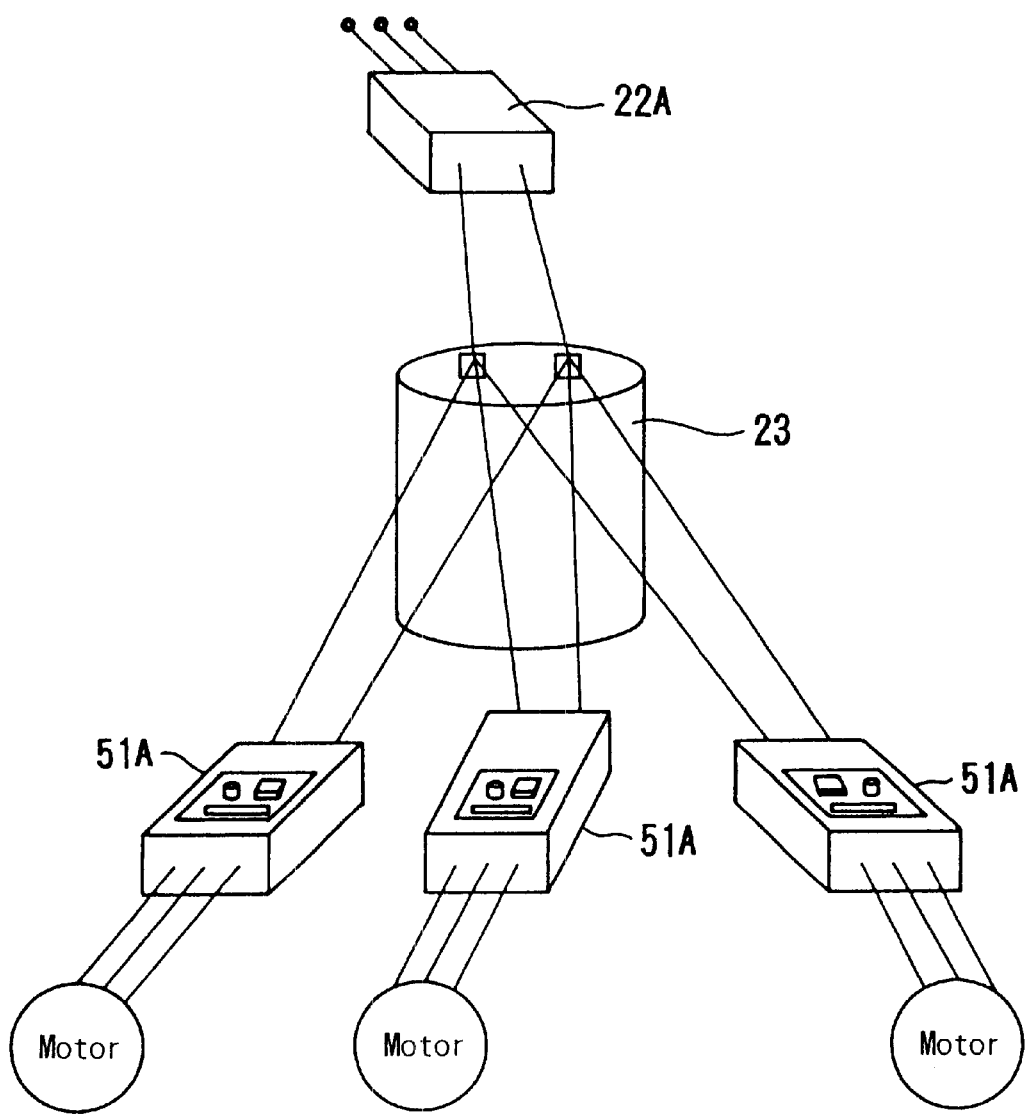
FIG. 16 is a wiring diagram of an inverter device which comprises a set of a converter section and a capacitor and a plurality of inverter sections.

FIG. 12 shows a circuit arrangement in which a set of a converter module 22A which is encased by molded resin and a capacitor 23, is combined with a plurality of inverter section modules, which are used to energize a plurality of motors M. Each of the inverter section modules comprises the module 51A or 51B shown in FIGS. 8 or 9. The converter module comprises the converter module 22A shown in FIG. 4. FIG. 16 shows a wired arrangement of the converter module 22A, the capacitor 23, and the inverter section modules. By using the converter module 22A and as many inverter section modules 51A, 51B as the number of motors, it is possible to eliminate any excessive circuit components and reduce the cost and size of the inverter device.

Figure 13:
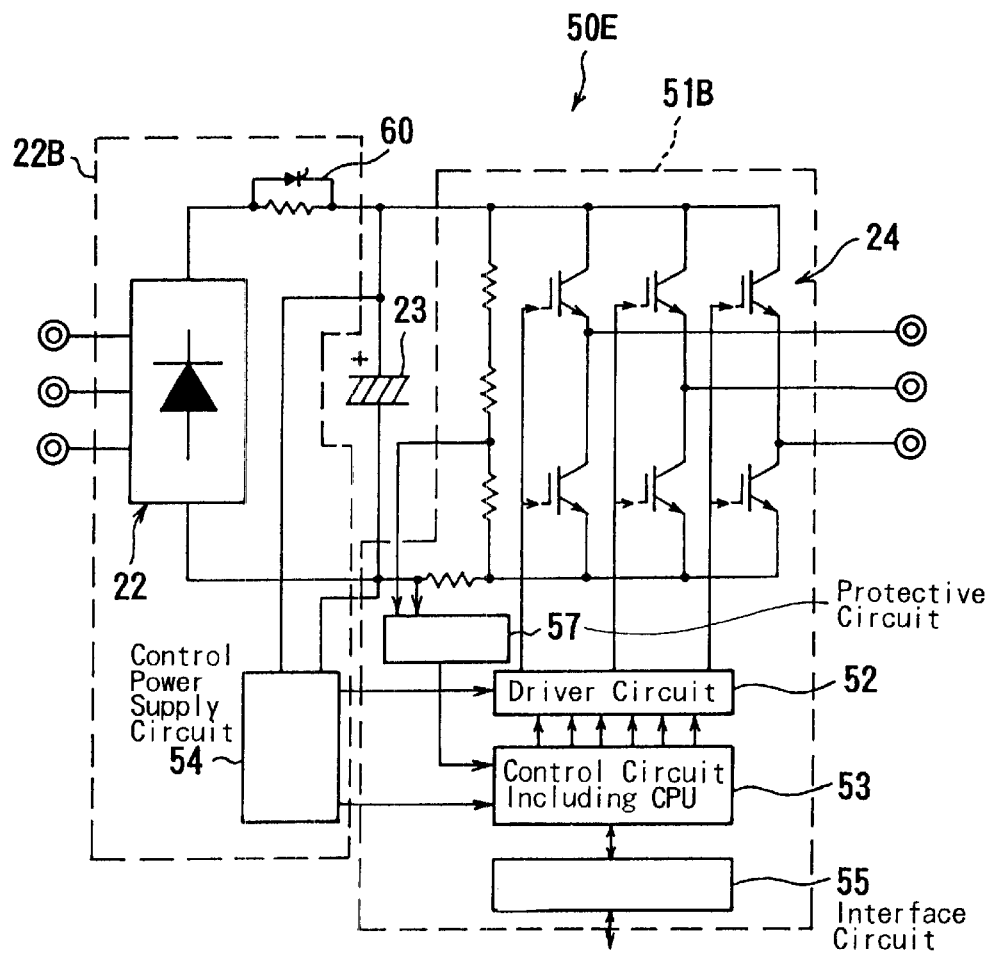
FIG. 13 is a circuit diagram of an inverter device which includes a control power supply circuit contained in a converter section.

FIG. 13 shows an inverter device 50E with a control power supply circuit included in a converter module 22B. The control power supply circuit 54 serves to supply a DC electric power of +5 V or the like from a DC voltage stored in the capacitor 23 to the control circuit. Each of the inverter module 51B is not necessarily required to be associated with the control power supply circuit 54. Thus, the control power supply circuit 54 is included in the converter module 22B, but not in the inverter section modules 51B. The inverter modules 51B can be supplied with a control electric power from the control power supply circuit 54 included in the converter module 22B. Accordingly, the inverter device can further be reduced in cost.

Figure 14:
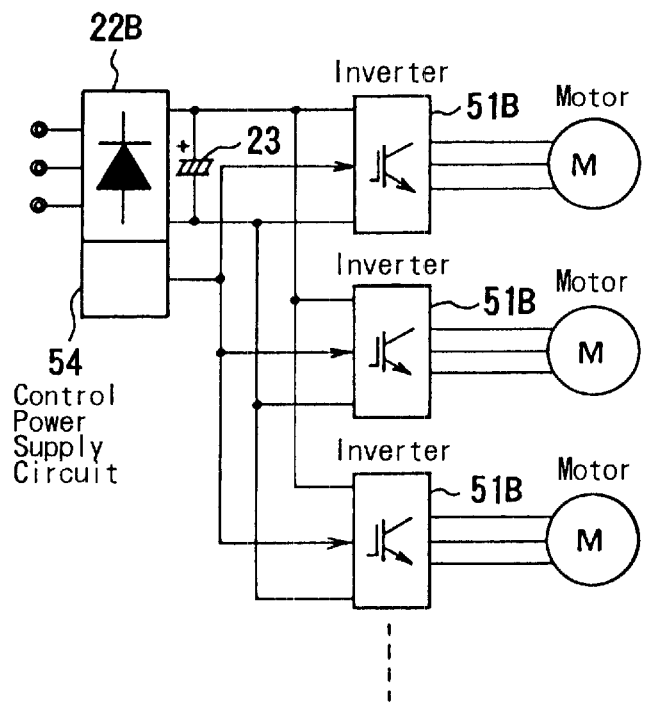
FIG. 14 is a circuit diagram of an inverter device which comprises a set of a converter section and a capacitor and a plurality of inverter sections.

FIG. 14 shows an example in which a converter module 22B having a single control power supply circuit and a capacitor 23 are combined with a plurality of inverter section modules 51B. Control circuits of the inverter section modules 51B operate by being supplied with an electric power from the control power supply circuit 54 included in the converter module 22B.

Since a CPU for controlling each inverter is combined with an electrically rewritable memory such as a flash memory, for example, then the control program of a module where the control circuit is encased by molded resin can be rewritten via the interface circuit. Consequently, the inverter device can easily be used in many types of pump systems that are manufactured in small lots.

Specifically, even after the inverter device has been installed at a site, details of the program thereof can be modified via the interface circuit, so that the pump or the like can be operated with such characteristics as depending on conditions of the installation site. Even if details of the program need to be modified after the test, since they can easily be rewritten via the interface circuit. Thus, such program modifications can easily be made immediately at the installation site. Even if it is necessary to modify operation characteristics of the inverters due to an addition of facilities, such a requirement can easily be met. Consequently, the inverter device is rendered highly flexible.

According to the third embodiment of the present invention, as described above, the inverter device is divided into a converter section and an inverter section which is encased into an integral module by molded resin. The inverter device can thus be constructed as a module, and hence can be assembled and wired with a reduced amount of labor and can be manufactured at a reduced cost. Furthermore, the inverter device can be reduced in overall size, and the cost thereof can be reduced as the number of packages which have heretofore been required is reduced. Moreover, inasmuch as any countermeasures for protecting the control circuit against moisture condensation are not needed, the inverter device according to the present invention can be installed at sites where there is a temperature difference, e.g., directly in a pump casing. The inverter device can thus be used highly conveniently.

A system for operating a plurality of pumps or fans with a plurality of motors employs a converter and a plurality of inverters. Therefore, the number of parts of the system is greatly reduced, and hence the system is reduced in overall cost and size. In addition, since the converter has a control power supply circuit, when a plurality of motors are energized by a plurality of inverter modules, the control circuits of the respective inverters may be supplied with an electric power from a single common control power supply circuit. Therefore, the cost of manufacture of the system is further reduced.

By using an electrically rewritable memory such as a flash memory or the like as a memory for storing a program for a control circuit, the program can be rewritten even after the control circuit has been encased by molded resin. Consequently, a program can be added or modified even after the inverter device has been manufactured or installed at the installation site.

A plurality of programs may be stored in advance, and one of the programs may be selected via an interface circuit depending on the use. Therefore, the present invention is easily applicable to many types of systems that are manufactured in small lots. The hardware arrangement can be reduced in cost as it can be mass-produced.

Industrial Applicability

A rotary machine and control device combination according to the present invention comprises a rotary machine such as a pump, a fan, or the like and a control device integral therewith. The rotary machine and control device combination is applicable to a wide range of rotary machines such as pumps, fans, or the like that can be controlled in speed by an inverter device. Such pumps and fans can be used in variable-speed water supply apparatus, air-conditioning systems, etc.

What is claimed is:

1. A rotary machine integrated with a control device, said control device comprising:

an inverter device for operating said rotary machine;

a memory for storing a control program for the inverter device and a program for controlling operation of said rotary machine;

a CPU operable according to the programs stored in the memory;

an input and output unit connected to a plurality of sensors and a plurality of switches positioned in said rotary machine;

at least one serial ports being connected to said CPU; and means for rewriting contents stored in said memory;

wherein said memory comprises a flash memory.

2. A rotary machine and control device combination according to claim 1, wherein said memory stores the control program for the inverter and the program for controlling operation of said rotary machine.

3. A rotary machine and control device combination according to claim 1, wherein said memory comprises a flash memory.

4. A rotary machine and control device combination comprising a plurality of rotary machines and control devices integral therewith according to claim 1, wherein said rotary machines have serial ports connected to each other for coordinated operation according to a machine adding and relieving process, an alternate machine operating process, and a failure machine-switching process.

5. A rotary machine and control device combination according to claim 1, wherein an electronic circuit section including the memory and the CPU of the control device is encased by molded resin.

6. A rotary machine integrated with a control device, said control device comprising:

an inverter device for operating said rotary machine;

a memory for storing a plurality of control programs;

a CPU operable according to the programs stored in the memory;

an input and output unit connected to a plurality of sensors and a plurality of switches positioned outside of said control device;

at least one serial ports being connected to said CPU; and means for externally selecting a control program to be used among said control programs;

wherein said memory comprises a flash memory.

7. A rotary machine and control device combination according to claim 6, wherein said memory stores a control program for the inverter device and a program for controlling operation of said rotary machine.

8. A rotary machine and control device combination comprising a plurality of rotary machines and control devices integral therewith according to claim 6, wherein said rotary machines have serial ports connected to each other for coordinated operation according to a machine adding and relieving process, an alternate machine operating process, and a failure machine-switching process.

9. A rotary machine and control device combination according to claim 6, wherein an electronic circuit section including the memory and the CPU of the control device is encased by molded resin.

* * * * *